United States Patent
Marek et al.

(10) Patent No.: US 11,170,581 B1
(45) Date of Patent: Nov. 9, 2021

(54) SUPERVISED DOMAIN ADAPTATION

(71) Applicant: Intrinsic Innovation LLC, Mountain View, CA (US)

(72) Inventors: Martina Marek, Munich (DE); Stefan Hinterstoisser, Munich (DE); Olivier Pauly, Munich (DE); Hauke Heibel, Höhenkirchen-Siegertsbrunn (DE); Martin Bokeloh, Munich (DE)

(73) Assignee: Intrinsic Innovation LLC, Mountain View, CA (US)

( * ) Notice: Subject to any disclaimer, the term of this patent is extended or adjusted under 35 U.S.C. 154(b) by 0 days.

(21) Appl. No.: 17/096,691

(22) Filed: Nov. 12, 2020

(51) Int. Cl.
*G06T 19/00* (2011.01)
*G06T 19/20* (2011.01)
*G06T 7/70* (2017.01)
*G06K 9/62* (2006.01)

(52) U.S. Cl.
CPC ............ *G06T 19/20* (2013.01); *G06K 9/6215* (2013.01); *G06T 7/70* (2017.01); *G06T 2207/20081* (2013.01); *G06T 2207/20084* (2013.01); *G06T 2219/2004* (2013.01)

(58) Field of Classification Search
None
See application file for complete search history.

(56) References Cited

U.S. PATENT DOCUMENTS

| | | | |
|---|---|---|---|
| 2017/0140253 A1 | 5/2017 | Wshah et al. | |
| 2017/0220904 A1* | 8/2017 | Bai | G06K 9/4604 |
| 2019/0087694 A1* | 3/2019 | Inoue | G06K 9/00718 |

FOREIGN PATENT DOCUMENTS

WO    WO 2020/102767    5/2020

OTHER PUBLICATIONS

Dong et al., "Unsupervised Domain Adaptation for Automatic Estimation of Cardiothoracic Ratio," CoRR, Jul. 2018, arxiv.org/abs/1807.03434v1, 11 pages.
Kamnitsas et al., "Unsupervised domain adaptation in brain lesion segmentation with adversarial networks," CoRR, Dec. 2016, arxiv.org/abs/1612.08894v1, 13 pages.
Kar et al., "Meta-Sim: Learning to Generate Synthetic Datasets," CoRR, Apr. 2019, arxiv.org/abs/1904.11621v1, 14 pages.

* cited by examiner

*Primary Examiner* — Martin Mushambo
(74) *Attorney, Agent, or Firm* — Fish & Richardson P.C.

(57) ABSTRACT

Methods, systems, and apparatus, including computer programs encoded on computer storage media, for training a feature extraction neural network to generate domain-invariant feature representations from domain-varying input images. In one aspect, the method includes obtaining a training dataset comprising a first set of target domain images and a second set of real domain images that each have pixel-wise level alignment with a corresponding target domain image, and training the feature extraction neural network on the training dataset based on optimizing an objective function that includes a term that depends on a similarity between respective feature representations generated by the network for a pair of target and source domain images.

21 Claims, 4 Drawing Sheets

SUPERVISED DOMAIN ADAPTATION

BACKGROUND

This specification relates to training neural networks.

Neural networks are machine learning models that employ one or more layers of nonlinear units to predict an output for a received input. Some neural networks include one or more hidden layers in addition to an output layer. The output of each hidden layer is used as input to the next layer in the network, i.e., the next hidden layer or the output layer. Each layer of the network generates an output from a received input in accordance with current values of a respective set of parameters.

Training data that includes real images and corresponding human-assigned labels (e.g., labeled bounding box(es)) has been utilized in training such models. However, generating such labeled training data can be expensive, both in terms of the labor cost relating to the time-consuming labeling process performed by human reviewers as well as the consumption of computational and/or network resources during the labeling process. When labelling of thousands or millions of real images are considered, the time required for the manual labeling process and, the corresponding cost associated with it can both be significant. Moreover, the human-assigned labels can include errors (e.g., misplaced bounding boxes) and the human labelling can be a time-consuming process. Further, setting up various real scenes and capturing real images can also be resource intensive.

Synthetic training data, that includes synthetic images and automatically generated labels, has also been utilized in training such models. Synthetic training data can overcome some of the drawbacks with training data that includes real images and human-assigned labels. However, training a machine learning model mainly or only on synthetic training data, with synthetic images generated according to various prior techniques, can still suffer from domain gap. This can be due to, for example, disparities between the synthetic images and real images. The domain gap can result in poor performance of the machine learning model, trained utilizing synthetic training data, when the machine learning model is utilized in making predictions based on real data.

SUMMARY

This specification describes a system implemented by one or more computers that can generate synthetic training data that can be used in training an image processing neural network while mitigating domain gaps. In particular, by utilizing a novel calibration object with fiducial markers affixed to its surface, the system can generate synthetic training images that each has pixel-level alignment with a real counterpart, i.e., a real training image.

The image processing neural network can generate network outputs for images that characterize the images. In particular, an image processing neural network receives an input image from a target domain (i.e., either real or synthetic domain) and processes the image using a feature extraction neural network to generate a shared feature representation of features of the input image that are shared between images from the target domain and images from a source domain different from the target domain. The image processing neural network then processes the shared feature representation using a representation processing neural network to generate a network output that characterizes the input image.

In particular, the image processing neural network can be configured through training to generate a network output that characterizes a received image in any of a variety of ways.

For example, the image processing neural network can be configured to identify candidate regions within the input image that are predicted to include specific objects of interest, i.e., to generate a detection output for an input image that includes bounding boxes that specify the boundaries of the candidate regions.

As another example, the image processing neural network can be configured to classify input images as including images of objects from one or more object categories, i.e., to generate a classification output for an input image that includes a respective score for each of the one or more object categories that represents a likelihood that the input image includes an image of an object that belongs to the object category.

As another example, the image processing neural network can be configured to estimate the pose of objects in input images. Generally, the pose of an object is a combination of the position and orientation of the object in the input image. For example, the network can generate a network output that specifies an estimated location in the image of each of a predetermined number of body joints of the object.

As another example, the image processing neural network can be configured to divide input images into multiple regions, each of which belongs to a different one of a set of categories. For example, the network can generate, as the network output, data, e.g., a vector or a matrix, that identifies for each pixel of the input image the category to which the pixel belongs.

As yet another example, the image processing neural network can be configured to generate an output that is a reconstruction or a modification of an input image. For example, the network can receive an input image from a source domain and generate, as the network output, a modified image that appears to be from a target domain different from the source domain. For example, the network can generate realistic looking images from synthetic input images.

Particular embodiments of the subject matter described in this specification can be implemented so as to realize one or more of the following advantages.

The neural network system implementing one or more neural networks trained using the techniques as described in this specification can achieve or even exceed state of the art performance on a range of supervised domain adaptation scenarios and is easily configurable to additionally generate outputs for a variety of perception tasks, e.g., object detection and/or classification, pose estimation, semantic segmentation, image reconstruction, and the like. The neural network system can extract features that are domain invariant in scenarios where the data distributions within target and source domains are different.

Implementations of the system facilitate effective training of image processing neural networks that are used to control or plan robots interacting with a real-world environment based on processing real-world vision data, even when the training data for the networks includes mainly (or solely) synthetic vision data. As a result, improved performance of robots on various tasks may thus be achieved by virtue of the improvement in their perception-related skills required for these tasks. In particular, a training system can modify synthetic vision data using the trained neural network system to generate realistic-looking replicas of the synthetic vision data, and thereafter apply the realistic-looking replicas of the synthetic vision data as training data in training such image processing neural networks. Compared with real-world vision data for robotic control, i.e., data collected under real-world environment, synthetic vision data is less time-intensive and less resource-intensive to collect, does not result in mechanical wear on the robot, and can have less noisy labels.

The details of one or more embodiments of the subject matter of this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

This specification describes a system implemented by one or more computers that can generate synthetic training images that have pixel-level alignment with real counterparts and thereafter use the data in training an image processing neural network while mitigating domain gaps.

Figure 1:
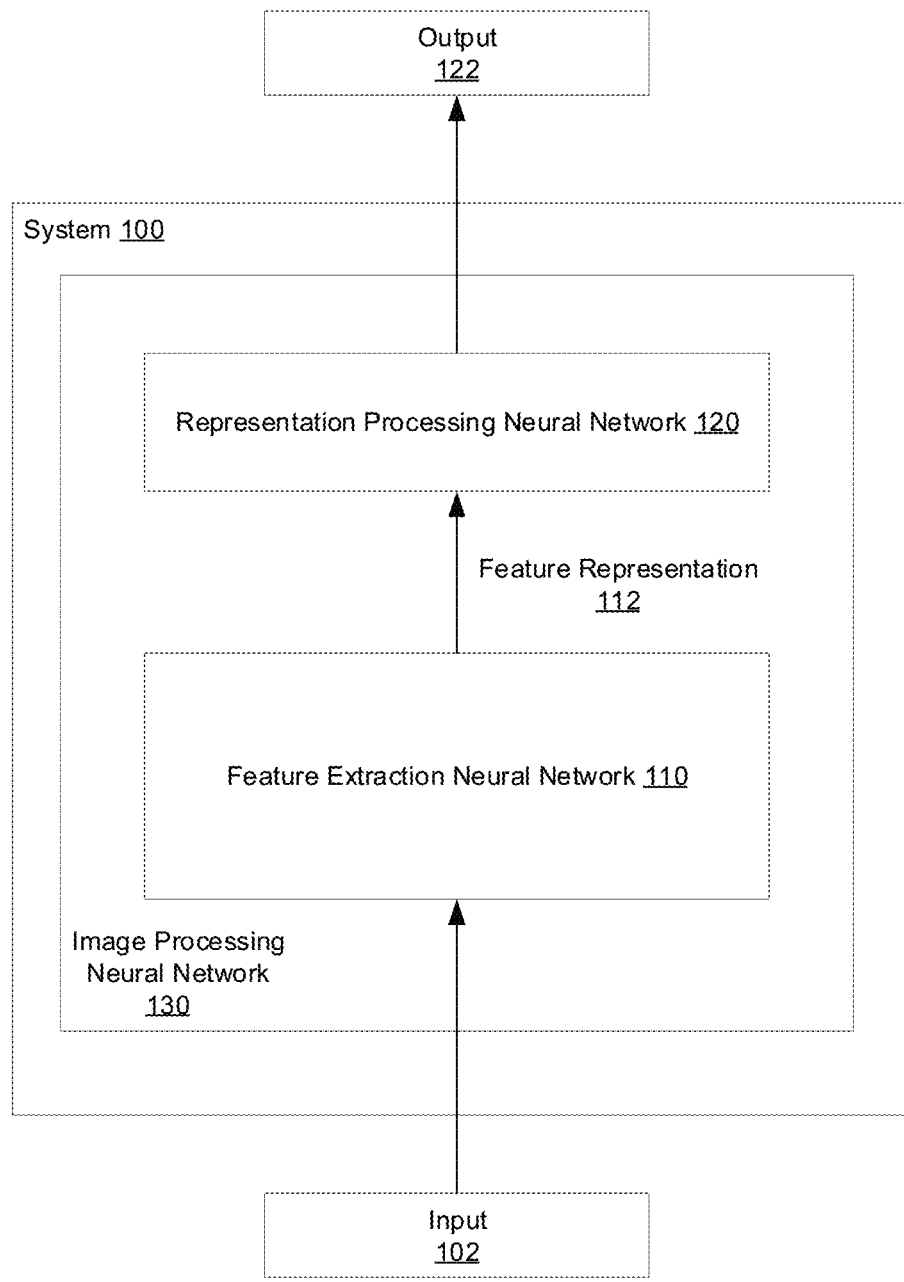
FIG. 1 shows an example image processing neural network system.

FIG. 1 shows an example image processing neural network system 100. The image processing neural network system 100 is an example of a system implemented as computer programs on one or more computers in one or more locations, in which the systems, components, and techniques described below can be implemented.

The image processing neural network system 100 receives as input an image 102 and processes the input image 102 to generate a network output 122. As described above, the image processing neural network system 100 can be configured to generate various kinds of network outputs for received input images.

The image processing neural network system 100 includes a feature extraction neural network 110 and a representation processing neural network 120.

The feature extraction neural network 110 is a neural network, e.g., a convolutional neural network, that has been configured through training to receive the input image 102 and to process the input image 102 to generate a feature representation 112 for the input image 102. Specifically, the input image 102 can be from either a target domain or a source domain. The feature representation 112, also referred to as a shared feature representation, is a vector of numeric values and is a representation of the features of the input image 102 that are shared between images from the target domain and images from the source domain.

Generally, the source domain is different from the target domain. For example, the distribution of pixel values in images from the source domain may be different from the distribution of pixel values in images from the target domain.

In some cases, the source and target domains differ primarily in terms of the distribution of low-level image statistics rather than high-level image statistics. Examples of low-level differences in the distributions include those arising due to blur, reflectance of materials, noise, resolution, illumination and color. High-level differences, on the other hand, may include differences that relate to the number of classes, the types of objects, and geometric variations, such as 3D position.

In some cases, the source domain may be images of a virtual environment that simulates a real-world environment and the target domain may be images of the real-world environment. For example, the source domain images may be images of a virtual environment that simulates a real-world environment that is to be interacted with by a robot or other mechanical agents, while the target domain images may be images of the real-world environment as captured by the robot or other mechanical agents.

In some cases, the source domain may be a domain in which images, especially labelled images, are easily available, while obtaining image data for the target domain is expensive (in terms of computational and/or human labor cost) or otherwise difficult or infeasible.

The representation processing neural network 120 is a neural network made up of one or more layers, e.g., one or more fully-connected layers, one or more convolutional layers, or one or more de-convolutional layers, that has been configured through training to receive the feature representation 112 and to process the feature representation 112 to generate the network output 122 for the input image 102.

Obtaining a synthetic training dataset using a calibration object affixed with one or more fiducial markers, and thereafter training the feature extraction neural network 110 and, optionally, together with the representation processing neural network 120 on the synthetic training dataset to generate the feature representation 112 is described in more detail below with reference to FIGS. 2-4B.

After training of the system is complete, the trained feature extraction neural network 110, the trained representation processing neural network 120, or both can be used to modify synthetic images to generate realistic looking images in massive volumes and at a relatively low cost, which can then be applied as training data for use in training suitable machine learning models that later on can be deployed on one or more robots for path planning or other robotics control tasks. This ensures satisfactory performance of the robots in the real-world environment, even if the training utilizes mainly (or solely) synthetic image, i.e., instead of real-world images which are expensive to collect.

Additionally or alternatively, the trained feature extraction neural network 110, the trained representation processing neural network 120, or both can be directly deployed on one or more robots and/or one or more computing devices. In some cases, the one or more robots can make use of the trained neural networks in attaining perception-related skills necessary for many robotics tasks, such as object detection and/or classification, semantic segmentation, pose estimation, etc. For example, object detection and classification can be utilized by a robot to identify certain types of objects and avoid collision with those certain types of objects. As another example, for a robot to manipulate (e.g., grasp, push, and/or pull) an object, the robot must be able to at least determine the position and orientation of the object in vision data with respect to the robot.

Figure 2:
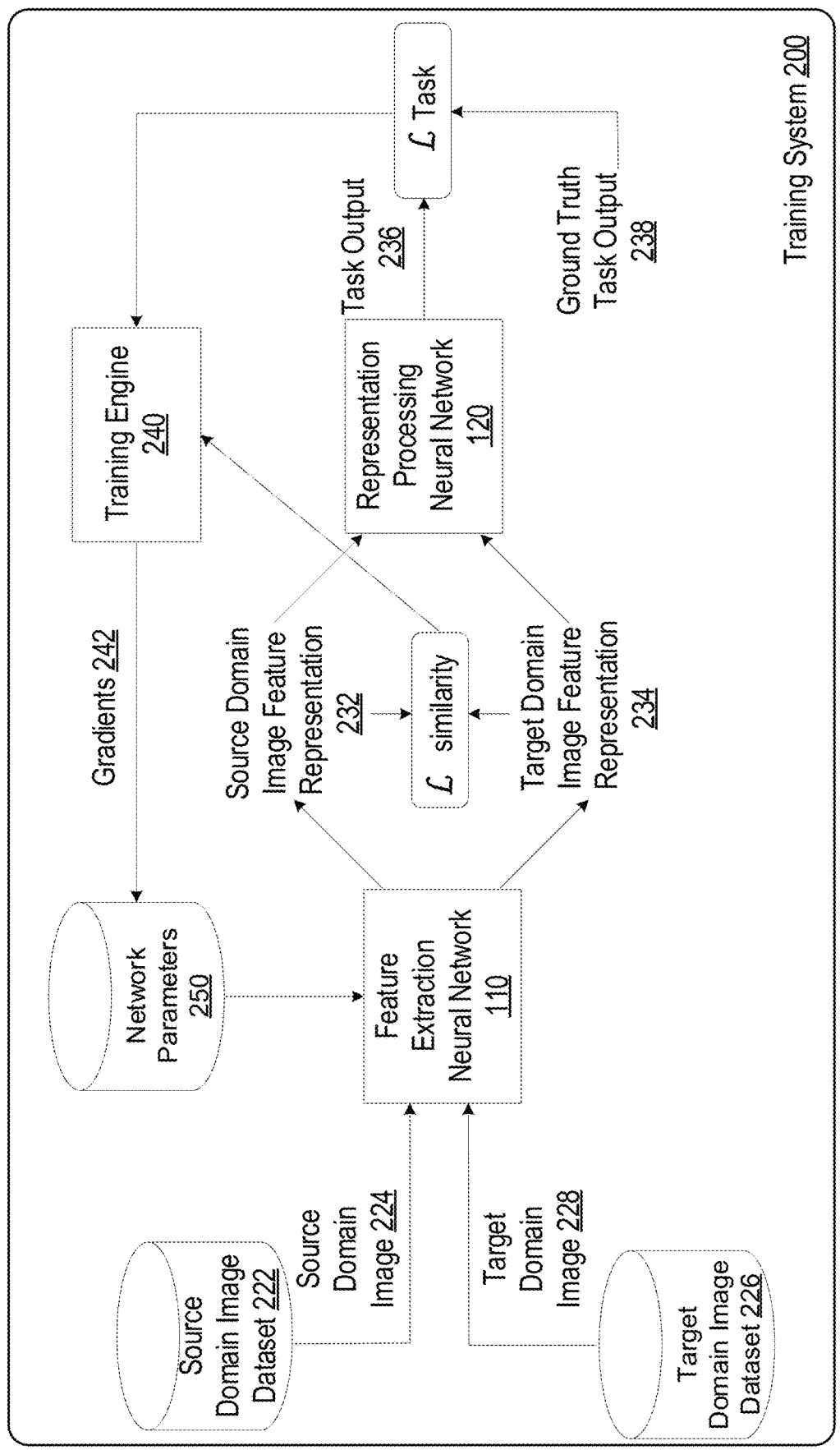
FIG. 2 shows an example neural network training system.

FIG. 2 shows an example neural network training system 200. The neural network training system 200 is an example of a system implemented as computer programs on one or more computers in one or more locations, in which the systems, components, and techniques described below can be implemented.

The neural network training system 200 trains the feature extraction neural network 110 to process an image, i.e., a source domain image 224 or a target domain image 228, to generate a feature representation for the input image, i.e., a source domain image feature representation 232 or a target domain image feature representation 234. The feature representation is a vector of numeric values and is a representation of the features of the input image that are shared between images from the source domain and images from the target domain that is different from the source domain.

The neural network training system 200 maintains a source domain image dataset 222 and a target domain image dataset 226. As will be described in more detail below with reference to FIG. 3, the source domain image dataset 222 includes synthetic images generated according to computer graphic renderings of a calibration object of arbitrary shape that has one or more fiducial markers affixed on its surface. For example, the calibration object can be a planar board, and each fiducial marker can be an augmented reality (AR) marker which is typically represented by a synthetic square image composed by a wide black border and an inner binary matrix which determines its unique identifier. The usage of a fiducial marker-affixed calibration object can facilitate accurate object pose estimation, i.e., retrieval of the six-dimensional pose of the calibration object with reference to a predetermined coordinate frame (e.g., camera frame), which would otherwise be difficult to achieve with the use of an ordinary object and only one fixed camera due to the lack of necessary spatial information about depth of a framed scene.

The target domain image dataset 226, on the other hand, includes a set of real-world images that are each paired with a corresponding synthetic image. Obtaining the set of target domain images 228 generally involves setting up various real scenes, including arranging the calibration object affixed with one or more fiducial markers in various different poses, and capturing real images using one or more vision sensors, e.g., camera sensors or other hand-held scanners.

Figure 4A:
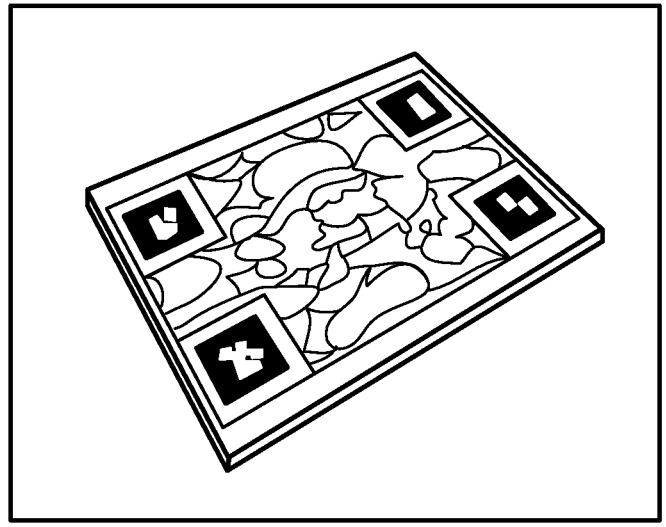
FIGS. 4A-B show an example calibration object with fiducial markers affixed to its surface.
Figure 4B:
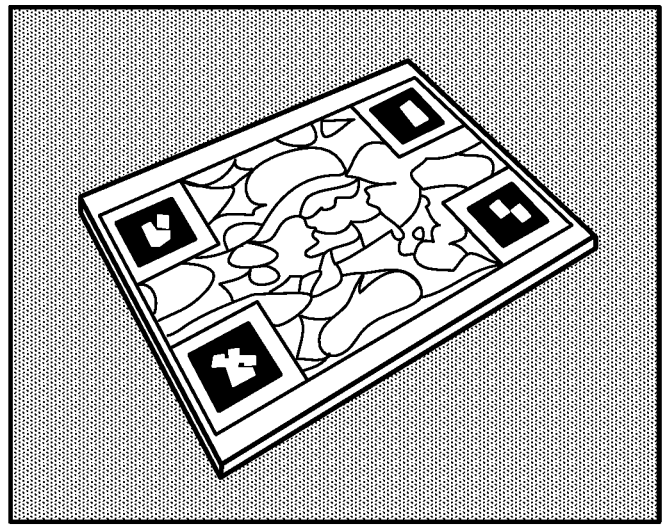

FIGS. 4A-B show an example calibration object with fiducial markers affixed to its surface. In particular, in the example of FIG. 4A, the calibration object which is in shape of a planar board that has a total of four AR markers affixed near the corners of its top surface. FIG. 4A is an example source domain image in which a synthetic instance of the calibration object is rendered on top of a virtual background. FIG. 4B is an example target domain image showing the calibration object on top of a real-world background, which has more texture than the virtual background.

In particular, each source domain image 224 from the source domain image dataset 222 is paired, or more precisely, aligned with a corresponding target domain image 228 from the target domain image dataset 226. Notably, for each pair of images, because the actual pose of a fiducial marker-affixed calibration object can be accurately estimated from the target domain image 228 showing the calibration object in a real scene, the corresponding source domain image 224 showing the calibration object in a synthetic background can be rendered in a way that closely replicates the actual pose of the calibration object in the real scene, thereby ensuring local alignment (i.e., aligning portions of images at the pixel block and/or individual pixel level), i.e., instead of merely global alignment (i.e., aligning whole images) between the image pair.

With respect to pixel-level alignment, these alignments may be correct to within a threshold number of pixels, e.g., 1, 5, or 10 pixels. For instance, if the alignment enforced by the system has a precision of 1 pixel and there is a sharp edge in a tile of size 1×1 pixel, the alignment may be off by at most one pixel in any direction.

A training engine 240 can use the source domain image dataset 222 and the target domain image dataset 226 to train the feature extraction neural network 110 and, optionally, the representation processing neural network 120, that is, to determine trained parameter values of each of the networks from initial parameter values.

Specifically, the training engine 240 iteratively trains the feature extraction neural network 110 by using the feature extraction neural network 110 to generate, in accordance with current values of the feature extraction network parameters, (i) a source domain image feature representation 232 from a source domain image 224 and (ii) a target domain image feature representation 234 from a target domain image 228. For each pair of source domain image feature representation 232 and target domain image feature representation 234, the training engine 240 can then determine a similarity loss, e.g., by computing a Frechet Distance, a dynamic time warping distance, an edit distance, a cosine similarity, a Kullback-Leibler (KL) divergence, a Euclidean distance, or a combination thereof between the pair of feature representations 232 and 234.

At the end of each training iteration, the training engine 240 can compute a gradient 242 with respect to the network parameters 250 of an objective function that includes a term that depends on the similarity loss. The training engine 240 can determine the gradients 242 of the objective function using, e.g., backpropagation techniques.

In particular, in some implementations, the training engine 240 can use this similarity loss as a standalone training objective. That is, the training engine 240 evaluates a distance function which measures the similarity and then determines the update to network parameters 250 based on computing a gradient of the similarity function with respect to the network parameters 250.

In some implementations, the training engine 240 can modify any of a variety of existing objective functions suitable for training the image processing neural network 130 of FIG. 1 that includes the feature extraction network 110 and the representation processing neural network 120 on a higher-level task to incorporate this additional term and thereafter compute a gradient of the modified, cumulative objective function that evaluates both similarity loss and higher-level task loss with respect to the network parameters 250, including the network parameters of the feature extraction neural network 110 and the network parameters of the representation processing neural network 120. As described above, the representation processing neural network 120 is configured to process the source domain image feature representation 232 or the target domain image feature representation 234 to generate a task output 236 for the higher-level task that generally requires generating a network output that characterizes the input image. For example, the higher-level perception task can be an object detection and/or classification task a semantic segmentation task, an object pose estimation task, or an image reconstruction task, and correspondingly, the existing objective function can be an objective function that evaluates a detection loss, classification loss, pose estimation loss, segmentation loss, reconstruction loss, or a combination thereof, with respect to a ground truth task output 238 associated with the input image.

In some implementations, the training engine 240 can interleave the training of feature extraction neural network with that of representation processing neural network. That is, the training engine 240 can alternate, e.g., depending on overall training progress, between (i) training the feature extraction neural network based on using the similarity loss as a standalone training objective (i.e., while keeping the parameter values of the representation processing neural network fixed), (ii) training the representation processing neural network based on using the higher-level task loss as a standalone training objective (i.e., while keeping the parameter values of the feature extraction neural network fixed, and (iii) jointly training the feature extraction neural network together with the representation processing neural network based on using the similarity loss and the higher-level task loss both as a cumulative objective function.

The training engine 240 then uses the gradient 242 to update the values of the network parameters 250, e.g., based on an appropriate gradient descent optimization technique (e.g., an RMSprop or Adam optimization procedure), to optimize (e.g., minimize) the objective function that depends at least on the similarity loss. The provision of this additional term that depends on the feature representation difference can provide richer and more reliable training signals, e.g., compared to objective functions that merely evaluate perception losses or reconstruction losses. This can stabilize the training and render the overall training more effective.

The training engine 240 can continue training the feature extraction neural network 110 until a training termination criterion is satisfied, e.g., until a predetermined number of training iterations have been performed, or until the similarity between each pair of feature representations 232 and 234 is below a predetermined threshold.

Figure 3:
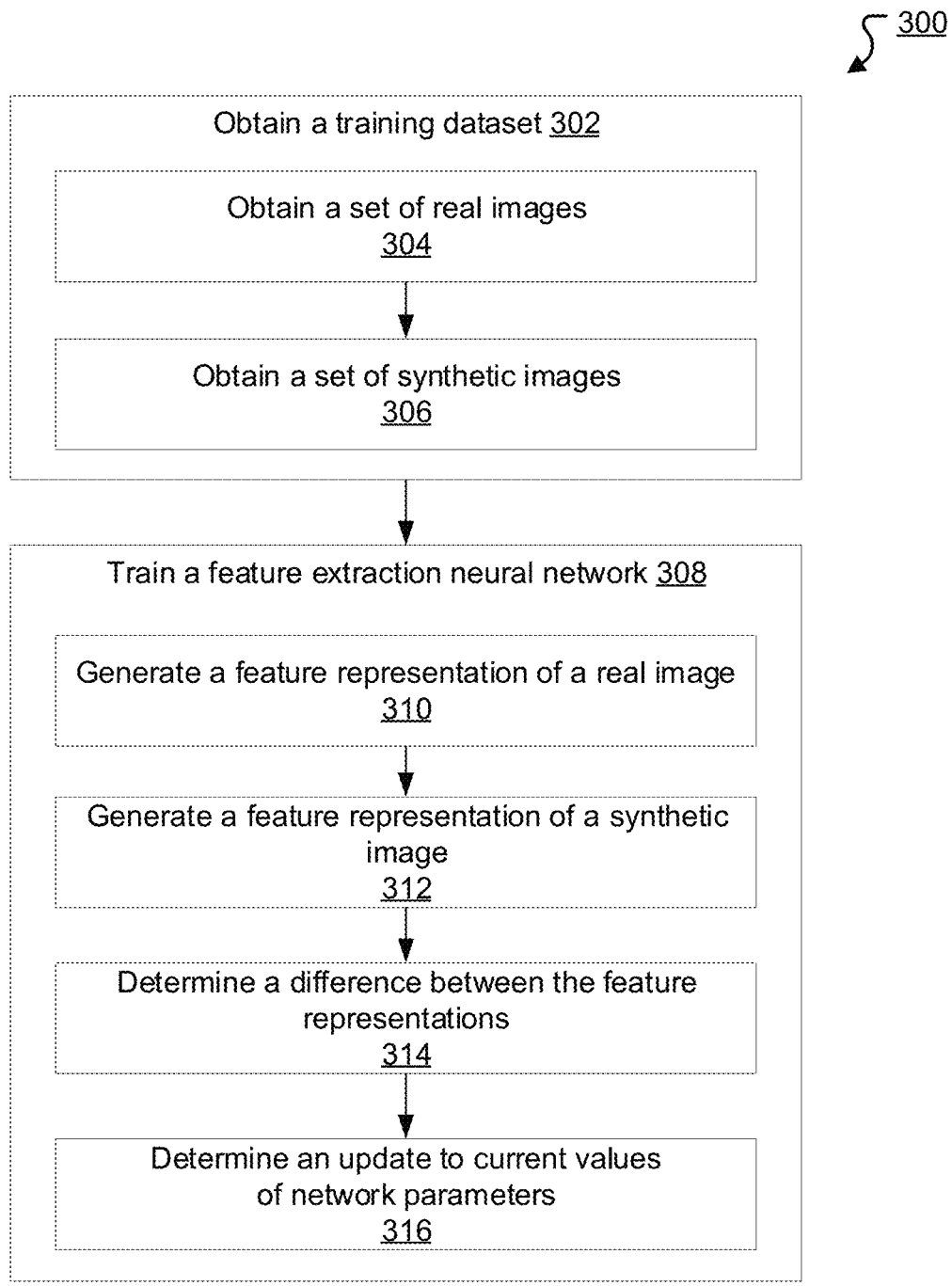
FIG. 3 is a flow diagram of an example process for training a feature extraction neural network.

FIG. 3 is a flow diagram of an example process 300 for training a feature extraction neural network. For convenience, the process 300 will be described as being performed by a system of one or more computers located in one or more locations. For example, an image processing neural network system, e.g., the neural network training system 200 of FIG. 2, appropriately programmed, can perform the process 300.

Briefly, the training process 300 involves obtaining a training dataset (302) and training the feature extraction neural network on the training dataset (308).

The training dataset includes a first set of target domain images, i.e., real images, and a second set of source domain images, i.e., synthetic images, that is each aligned with a corresponding target domain image at a pixel-level.

The system can obtain the training dataset in any of a variety of ways. For example, the system can receive training dataset as an upload from a remote user of the system over a data communication network, e.g., using an application programming interface (API) made available by the system. As another example, the system can receive an input from a user specifying which data that is already maintained by the system should be used in the training.

The system obtains the first set of real images (304). Generating these real images typically involves setting up various real scenes, including arranging the calibration object affixed with one or more fiducial markers in various different poses, and capturing real images using one or more vision sensors, e.g., camera sensors or other hand-held scanners. Each real image captured in this way can depict the calibration object with a respective pose on a real background. A pose of the calibration object refers to an orientation, a position, or both of the calibration object with reference to a predetermined coordinate frame.

The system obtains the second set of synthetic images (306). Generating these synthetic images involves rendering, e.g., by using respective application programming interfaces (APIs) offered by a 3-D graphics rendering library and a computer vision library and for each of some or all of the real images from the first set of real images, a computer graphics model of the calibration object according to an estimated pose of the calibration object characterized in the real image. Each synthetic image generated in this way can depict a synthetic instance of the calibration object with the respective estimated pose on a synthetic background.

In more detail, each such synthetic image can be generated by first determining, for the fiducial marker-affixed calibration object characterized in a corresponding real image and from the one or more fiducial markers in the field-of-view of the vision sensor, a position and orientation of the calibration object with reference to a predetermined coordinate frame, and thereafter rendering, e.g., on top of a synthetic background, the computer graphics model of the calibration object to be in an identical position and orientation as the calibration object characterized in the real image.

In some cases, image registration techniques such as subpixel registration algorithms can be utilized to further improve geometrical alignment between each pair of real and synthetic images.

In some cases, the real and synthetic images may each only depict the calibration object, i.e., without showing the background. In some such cases, the real and synthetic images may each only depict a portion of the calibration object, e.g., the portion of the calibration object excluding the fiducial markers.

The usage of fiducial marker-affixed calibration objects and, in some cases, image registration techniques, collectively ensure that every synthetic image can have pixel-level alignment with the corresponding real image. This facilitates the training of the feature extraction neural network in generating feature representations for input images from the real domain that are substantially identical to feature representations for input images from the synthetic domain.

Optionally, the real images, synthetic images, or both are labelled images. A labelled image is an image for which a known network output, i.e., the network output that should be generated by a neural network for the image, e.g., bounding boxes or likelihood scores, is available to the system during training. For example, the real images are each associated with a human-assigned label, while the synthetic images are each associated with an automatically assigned label.

The system then proceeds to training the feature extraction neural network on the training dataset. During training the system can repeatedly perform steps 310-316 for each pair of real and synthetic images obtained from the training dataset.

The system processes the real image using the feature extraction neural network in accordance with current values of the feature extraction network parameters to generate a feature representation of the real image (310). Typically, the feature representation is the output of the last layer of the feature extraction neural network or a combination of the outputs of multiple layers of the feature extraction neural network. For example, the feature representation can take the form of a feature vector or a feature embedding, e.g., a fixed-size multi-dimensional array of data values.

The system processes the synthetic image using the feature extraction neural network in accordance with current values of the feature extraction network parameters generate a feature representation of the synthetic image (312).

The system determines a similarity loss between the feature representation of the real image and the feature representation of the synthetic image (314), e.g., by computing a Frechet Distance, a dynamic time warping distance, an edit distance, a cosine similarity, a Kullback-Leibler (KL) divergence, a Euclidean distance, or a combination thereof.

The system determines one or more updates to the current values of the feature extraction network parameters (316) by determining a gradient with respect to the feature extraction network parameters of an objective function that includes a first term that depends on the similarity loss. The similarity loss trains the feature extraction neural network to generate feature representations for input images from the real domain that are similar to feature representations for input images from the synthetic domain.

In some implementations, as part of the training, the system trains the image processing neural network as a whole on a higher-level task that generally requires generating a network output that characterizes an object in the input image. In other words, the system trains the feature extraction neural network together with the representation processing neural network that is configured to process, in accordance with current values of representation processing network parameters, the real image feature representation or the synthetic image feature representation to generate a network output for the higher-level task.

For example, the higher-level task can be a perception task, e.g., an object detection and/or classification task, an object pose estimation task, or a semantic segmentation task. As another example, higher-level task can be an image reconstruction task.

In such implementations, the objective function can include a second term that depends on a high-level task loss, i.e., the performance of the image processing neural network on the higher-level task, and the system can determine the update to the current values of the feature extraction network parameters by backpropagating a determined gradient of the objective function through the representation processing network parameters into the feature extraction network parameters.

The perception loss, e.g., detection loss, classification loss, pose estimation loss, or segmentation loss, trains the representation processing neural network to generate accurate network outputs that match the known network output for input images from either the real or synthetic domains and, by virtue of backpropagation, the feature extraction neural network to generate domain-invariant feature representations of input images, i.e., to generate feature representations for input images from the synthetic domain that are similar to feature representations for input images from the real domain.

The reconstruction loss trains the representation processing neural network to generate reconstructions of the input images that match the input images from either the synthetic or real domains and, by virtue of backpropagation, the feature extraction neural network to generate domain-invariant feature representations of input images.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non-transitory storage medium for execution by, or to control the operation of, data processing apparatus. The computer storage medium can be a machine-readable storage device, a machine-readable storage substrate, a random or serial access memory device, or a combination of one or more of them. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus.

The term "data processing apparatus" refers to data processing hardware and encompasses all kinds of apparatus, devices, and machines for processing data, including by way of example a programmable processor, a computer, or multiple processors or computers. The apparatus can also be, or further include, special purpose logic circuitry, e.g., an FPGA (field programmable gate array) or an ASIC (application-specific integrated circuit). The apparatus can optionally include, in addition to hardware, code that creates an execution environment for computer programs, e.g., code that constitutes processor firmware, a protocol stack, a database management system, an operating system, or a combination of one or more of them.

A computer program which may also be referred to or described as a program, software, a software application, an app, a module, a software module, a script, or code) can be written in any form of programming language, including compiled or interpreted languages, or declarative or procedural languages, and it can be deployed in any form, including as a stand-alone program or as a module, component, subroutine, or other unit suitable for use in a computing environment. A program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub-programs, or portions of code. A computer program can be deployed to be executed on one computer or on multiple computers that are located at one site or distributed across multiple sites and interconnected by a data communication network.

For a system of one or more computers to be configured to perform particular operations or actions means that the system has installed on it software, firmware, hardware, or a combination of them that in operation cause the system to perform the operations or actions. For one or more computer programs to be configured to perform particular operations or actions means that the one or more programs include instructions that, when executed by data processing apparatus, cause the apparatus to perform the operations or actions.

As used in this specification, an "engine," or "software engine," refers to a software implemented input/output system that provides an output that is different from the input. An engine can be an encoded block of functionality, such as a library, a platform, a software development kit ("SDK"), or an object. Each engine can be implemented on any appropriate type of computing device, e.g., servers, mobile phones, tablet computers, notebook computers, music players, e-book readers, laptop or desktop computers, PDAs, smart phones, or other stationary or portable devices, that includes one or more processors and computer readable media. Additionally, two or more of the engines may be implemented on the same computing device, or on different computing devices.

The processes and logic flows described in this specification can be performed by one or more programmable computers executing one or more computer programs to perform functions by operating on input data and generating output. The processes and logic flows can also be performed by special purpose logic circuitry, e.g., an FPGA or an ASIC, or by a combination of special purpose logic circuitry and one or more programmed computers.

Computers suitable for the execution of a computer program can be based on general or special purpose microprocessors or both, or any other kind of central processing unit. Generally, a central processing unit will receive instructions and data from a read-only memory or a random access memory or both. The essential elements of a computer are a central processing unit for performing or executing instructions and one or more memory devices for storing instructions and data. The central processing unit and the memory can be supplemented by, or incorporated in, special purpose logic circuitry. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer-readable media suitable for storing computer program instructions and data include all forms of nonvolatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and pointing device, e.g., a mouse, trackball, or a presence sensitive display or other surface by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser. Also, a computer can interact with a user by sending text messages or other forms of message to a personal device, e.g., a smartphone, running a messaging application, and receiving responsive messages from the user in return.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface, a web browser, or an app through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network (LAN) and a wide area network (WAN), e.g., the Internet.

The computing system can include clients and servers. A client and server are generally remote from each other and typically interact through a communication network. The relationship of client and server arises by virtue of computer programs running on the respective computers and having a client-server relationship to each other. In some embodiments, a server transmits data, e.g., an HTML page, to a user device, e.g., for purposes of displaying data to and receiving user input from a user interacting with the device, which acts as a client. Data generated at the user device, e.g., a result of the user interaction, can be received at the server from the device.

In addition to the embodiments described above, the following embodiments are also innovative:

Embodiment 1 is a method comprising:
  obtaining a training dataset comprising a first set of real images and a second set of synthetic images, comprising;
  obtaining the first set of real image based on capturing multiple sensor observations of a calibration object;
  obtaining, for each real image in the first set of real images, a corresponding synthetic image that has pixel-level alignment with the real image including rendering a computer graphics model of the calibration object according to a pose of the calibration object characterized in the real image; and
  training a feature extraction neural network having a plurality of feature extraction network parameters on the training dataset, comprising, for each pair of real and synthetic images:
    processing the real image using the feature extraction neural network in accordance with current values of the feature extraction network parameters to generate a feature representation of the real image;
    processing the synthetic image using the feature extraction neural network in accordance with current values of the feature extraction network parameters generate a feature representation of the synthetic image;
    determining a similarity between the feature representation of the real image and the feature representation of the synthetic image; and
    determining one or more updates to the current values of the feature extraction network parameters by determining a gradient with respect to the feature extraction network parameters of an objective function that includes (i) a first term that depends on the similarity and (ii) a second terms that depends on a performance of an image processing neural network on a higher level task based on processing the feature representation using an representation processing neural network of the image processing neural network.

Embodiment 2 is the method of embodiment 1, wherein the calibration object comprises one or more fiducial markers affixed to one or more surfaces of the calibration object.

Embodiment 3 is the method of any one of embodiments 1-2, wherein obtaining, for each real image in the first set of real images, the corresponding synthetic image based on generating the computer graphics model of the calibration object according to the pose of the calibration object characterized in the real image comprises:
  determining, from the sensor observation of the one or more fiducial markers, a position and orientation of the calibration object characterized in the real image; and rendering the computer graphics model of the calibration object to be in a same position and orientation as the calibration object characterized in the real image.

Embodiment 4 is the method of any one of embodiments 1-3, wherein obtaining, for each real image in the first set of real images, the corresponding synthetic image based on rendering the computer graphics model of the calibration object according to the pose of the calibration object characterized in the real image further comprises:

generating the corresponding synthetic image using sub-pixel registration techniques.

Embodiment 5 is the method of any one of embodiments 1-4, wherein the feature extraction neural network is part of the image processing neural network, and wherein the representation processing neural network is configured to process the feature representation generated by the feature extraction neural network to generate a network output for a perception task, and wherein the method further comprises:

processing a network input using the feature extraction neural network in accordance with the current values of the feature extraction network parameters to generate a feature representation of the network input;

processing the feature representation of the network input using the representation processing neural network in accordance with current values of network parameters of the representation processing neural network to generate the network output;

determining a first difference between the network output and a ground truth output associated with the network input; and determining an update to the current values of the feature extraction network parameters by determining a gradient with respect to the feature extraction network parameters of the objective function that includes a term that depends on the first difference.

Embodiment 6 is the method of any one of embodiments 1-5, wherein the feature extraction neural network is part of the image processing neural network, and wherein the representation processing neural network is configured to process the feature representation output from the feature extraction neural network to generate a reconstruction of the network input, and wherein the method further comprises:

processing the network input using the feature extraction neural network in accordance with the current values of the feature extraction network parameters to generate a feature representation of the network input;

processing the feature representation of the network input using the representation processing neural network in accordance with current values of network parameters of the representation processing neural network to generate the reconstruction of the network input;

determining a second difference between the network input and the reconstruction of the network input; and determining an update to the current values of the feature extraction network parameters by determining a gradient with respect to the feature extraction network parameters of the objective function that includes a term that depends on the second difference.

Embodiment 7 is the method of any one of embodiments 5-6, wherein determining the update to the current values of the feature extraction network parameters further comprises:

backpropagating the gradient of the objective function through the network parameters of the representation processing neural network into the network parameters of feature extraction neural network.

Embodiment 8 is the method of any one of embodiments 1-7, wherein the perception task is an object detection or classification task.

Embodiment 9 is the method of any one of embodiments 1-7, wherein the perception task is a pose estimation task or a semantic segmentation task.

Embodiment 10 is the method of any one of embodiments 1-7, wherein the perception task is an image reconstruction task.

Embodiment 11 is a system comprising: one or more computers and one or more storage devices storing instructions that are operable, when executed by the one or more computers, to cause the one or more computers to perform the method of any one of embodiments 1 to 10.

Embodiment 12 is a computer storage medium encoded with a computer program, the program comprising instructions that are operable, when executed by data processing apparatus, to cause the data processing apparatus to perform the method of any one of embodiments 1 to 10.

While this specification contains many specific implementation details, these should not be construed as limitations on the scope of any invention or on the scope of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially be claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain some cases, multitasking and parallel processing may be advantageous.

What is claimed is:

1. A method comprising:
    obtaining a training dataset comprising a first set of real images and a second set of synthetic images, comprising:
        obtaining the first set of real image based on capturing multiple sensor observations of a calibration object;
        obtaining, for each real image in the first set of real images, a corresponding synthetic image that has pixel-level alignment with the real image including rendering a computer graphics model of the calibration object according to a pose of the calibration object characterized in the real image; and training a feature extraction neural network having a plurality of feature extraction network parameters on the training dataset, comprising, for each pair of real and synthetic images:
- processing the real image using the feature extraction neural network in accordance with current values of the feature extraction network parameters to generate a feature representation of the real image;
- processing the synthetic image using the feature extraction neural network in accordance with current values of the feature extraction network parameters generate a feature representation of the synthetic image;
- determining a similarity between the feature representation of the real image and the feature representation of the synthetic image; and
- determining one or more updates to the current values of the feature extraction network parameters by determining a gradient with respect to the feature extraction network parameters of an objective function that includes (i) a first term that depends on the similarity and (ii) a second terms that depends on a performance of an image processing neural network on a higher level task based on processing the feature representation using an representation processing neural network of the image processing neural network.

2. The method of claim 1, wherein the calibration object comprises one or more fiducial markers affixed to one or more surfaces of the calibration object.

3. The method of claim 1, wherein obtaining, for each real image in the first set of real images, the corresponding synthetic image based on generating the computer graphics model of the calibration object according to the pose of the calibration object characterized in the real image comprises:
- determining, from the sensor observation of the one or more fiducial markers, a position and orientation of the calibration object characterized in the real image; and
- rendering the computer graphics model of the calibration object to be in a same position and orientation as the calibration object characterized in the real image.

4. The method of claim 3, wherein obtaining, for each real image in the first set of real images, the corresponding synthetic image based on rendering the computer graphics model of the calibration object according to the pose of the calibration object characterized in the real image further comprises:
- generating the corresponding synthetic image using sub-pixel registration techniques.

5. The method of claim 1, wherein the feature extraction neural network is part of the image processing neural network, and wherein the representation processing neural network is configured to process the feature representation generated by the feature extraction neural network to generate a network output for a perception task, and wherein the method further comprises:
- processing a network input using the feature extraction neural network in accordance with the current values of the feature extraction network parameters to generate a feature representation of the network input;
- processing the feature representation of the network input using the representation processing neural network in accordance with current values of network parameters of the representation processing neural network to generate the network output;
- determining a first difference between the network output and a ground truth output associated with the network input; and
- determining an update to the current values of the feature extraction network parameters by determining a gradient with respect to the feature extraction network parameters of the objective function that includes a term that depends on the first difference.

6. The method of claim 5, wherein determining the update to the current values of the feature extraction network parameters further comprises:
- backpropagating the gradient of the objective function through the network parameters of the representation processing neural network into the network parameters of feature extraction neural network.

7. The method of claim 5, wherein the perception task is an object detection or classification task.

8. The method of claim 5, wherein the perception task is a pose estimation task or a semantic segmentation task.

9. The method of claim 5, wherein the perception task is an image reconstruction task.

10. The method of claim 1, wherein the feature extraction neural network is part of the image processing neural network, and wherein the representation processing neural network is configured to process the feature representation output from the feature extraction neural network to generate a reconstruction of the network input, and wherein the method further comprises:
- processing the network input using the feature extraction neural network in accordance with the current values of the feature extraction network parameters to generate a feature representation of the network input;
- processing the feature representation of the network input using the representation processing neural network in accordance with current values of network parameters of the representation processing neural network to generate the reconstruction of the network input;
- determining a second difference between the network input and the reconstruction of the network input; and
- determining an update to the current values of the feature extraction network parameters by determining a gradient with respect to the feature extraction network parameters of the objective function that includes a term that depends on the second difference.

11. A system comprising one or more computers and one or more storage devices storing instructions that when executed by the one or more computers cause the one or more computers to perform operations comprising:
- obtaining a training dataset comprising a first set of real images and a second set of synthetic images, comprising:
  - obtaining the first set of real image based on capturing multiple sensor observations of a calibration object;
  - obtaining, for each real image in the first set of real images, a corresponding synthetic image that has pixel-level alignment with the real image including rendering a computer graphics model of the calibration object according to a pose of the calibration object characterized in the real image; and
- training a feature extraction neural network having a plurality of feature extraction network parameters on the training dataset, comprising, for each pair of real and synthetic images:
  - processing the real image using the feature extraction neural network in accordance with current values of the feature extraction network parameters to generate a feature representation of the real image;

processing the synthetic image using the feature extraction neural network in accordance with current values of the feature extraction network parameters generate a feature representation of the synthetic image;

determining a similarity between the feature representation of the real image and the feature representation of the synthetic image; and determining one or more updates to the current values of the feature extraction network parameters by determining a gradient with respect to the feature extraction network parameters of an objective function that includes (i) a first term that depends on the similarity and (ii) a second terms that depends on a performance of an image processing neural network on a higher level task based on processing the feature representation using an representation processing neural network of the image processing neural network.

12. The system of claim 11, wherein the calibration object comprises one or more fiducial markers affixed to one or more surfaces of the calibration object.

13. The system of claim 11, wherein obtaining, for each real image in the first set of real images, the corresponding synthetic image based on generating the computer graphics model of the calibration object according to the pose of the calibration object characterized in the real image comprises:

determining, from the sensor observation of the one or more fiducial markers, a position and orientation of the calibration object characterized in the real image; and rendering the computer graphics model of the calibration object to be in a same position and orientation as the calibration object characterized in the real image.

14. The system of claim 13, wherein obtaining, for each real image in the first set of real images, the corresponding synthetic image based on rendering the computer graphics model of the calibration object according to the pose of the calibration object characterized in the real image further comprises:

generating the corresponding synthetic image using sub-pixel registration techniques.

15. The system of claim 11, wherein the feature extraction neural network is part of the image processing neural network, and wherein the representation processing neural network is configured to process the feature representation generated by the feature extraction neural network to generate a network output for a perception task, and wherein the method further comprises:

processing a network input using the feature extraction neural network in accordance with the current values of the feature extraction network parameters to generate a feature representation of the network input;

processing the feature representation of the network input using the representation processing neural network in accordance with current values of network parameters of the representation processing neural network to generate the network output;

determining a first difference between the network output and a ground truth output associated with the network input; and determining an update to the current values of the feature extraction network parameters by determining a gradient with respect to the feature extraction network parameters of the objective function that includes a term that depends on the first difference.

16. The system of claim 15, wherein determining the update to the current values of the feature extraction network parameters further comprises:

backpropagating the gradient of the objective function through the network parameters of the representation processing neural network into the network parameters of feature extraction neural network.

17. The system of claim 15, wherein the perception task is an object detection or classification task.

18. The system of claim 15, wherein the perception task is a pose estimation task or a semantic segmentation task.

19. The system of claim 15, wherein the perception task is an image reconstruction task.

20. The system of claim 11, wherein the feature extraction neural network is part of the image processing neural network, and wherein the representation processing neural network is configured to process the feature representation output from the feature extraction neural network to generate a reconstruction of the network input, and wherein the method further comprises:

processing the network input using the feature extraction neural network in accordance with the current values of the feature extraction network parameters to generate a feature representation of the network input;

processing the feature representation of the network input using the representation processing neural network in accordance with current values of network parameters of the representation processing neural network to generate the reconstruction of the network input;

determining a second difference between the network input and the reconstruction of the network input; and determining an update to the current values of the feature extraction network parameters by determining a gradient with respect to the feature extraction network parameters of the objective function that includes a term that depends on the second difference.

21. One or more non-transitory computer-readable storage media storing instructions that when executed by one or more computers cause the one or more computers to perform operations comprising:

obtaining a training dataset comprising a first set of real images and a second set of synthetic images, comprising:

obtaining the first set of real image based on capturing multiple sensor observations of a calibration object;

obtaining, for each real image in the first set of real images, a corresponding synthetic image that has pixel-level alignment with the real image including rendering a computer graphics model of the calibration object according to a pose of the calibration object characterized in the real image; and training a feature extraction neural network having a plurality of feature extraction network parameters on the training dataset, comprising, for each pair of real and synthetic images:

processing the real image using the feature extraction neural network in accordance with current values of the feature extraction network parameters to generate a feature representation of the real image;

processing the synthetic image using the feature extraction neural network in accordance with current values of the feature extraction network parameters generate a feature representation of the synthetic image;

determining a similarity between the feature representation of the real image and the feature representation of the synthetic image; and determining one or more updates to the current values of the feature extraction network parameters by determining a gradient with respect to the feature extraction network parameters of an objective function that includes (i) a first term that depends on the similarity and (ii) a second terms that depends on a performance of an image processing neural network on a higher level task based on processing the feature representation using an representation processing neural network of the image processing neural network.

* * * * *